United States Patent [19]

Takagi

[11] Patent Number: 5,440,708
[45] Date of Patent: Aug. 8, 1995

[54] MICROPROCESSOR AND STORAGE MANAGEMENT SYSTEM HAVING SAID MICROPROCESSOR

[75] Inventor: Katsuaki Takagi, Kawagoe, Japan

[73] Assignee: Hitachi, Ltd., Tokyo, Japan

[21] Appl. No.: 906,967

[22] Filed: Jun. 30, 1992

[30] Foreign Application Priority Data

Jul. 9, 1991 [JP] Japan .................... 3-194756

[51] Int. Cl.⁶ .............. G06F 12/10; G06F 13/14; G06F 13/16
[52] U.S. Cl. ............................ 395/418; 395/500
[58] Field of Search ............ 395/400, 425, 500, 325

[56] References Cited

U.S. PATENT DOCUMENTS

| | | | |
|---|---|---|---|
| 4,394,731 | 7/1983 | Flusche et al. | 395/425 |
| 4,400,770 | 8/1983 | Chan et al. | 395/425 |
| 4,685,082 | 8/1987 | Cheung et al. | 395/425 |
| 4,785,398 | 11/1988 | Joyce et al. | 395/425 |
| 5,003,459 | 3/1991 | Ramanujan et al. | 350/400 |
| 5,109,335 | 4/1992 | Watanabe | 395/400 |
| 5,113,369 | 5/1992 | Kinoshita | 395/325 |
| 5,123,101 | 6/1992 | Sindhu | 395/425 |
| 5,226,143 | 7/1993 | Baird et al. | 395/425 |
| 5,230,045 | 7/1993 | Sindhu et al. | 395/425 |
| 5,249,284 | 9/1993 | Kass et al. | 395/425 |
| 5,265,235 | 11/1993 | Sindhu et al. | 395/425 |
| 5,274,730 | 12/1993 | Nakao | 395/325 |
| 5,280,598 | 1/1994 | Osaki et al. | 395/425 |
| 5,287,473 | 2/1994 | Mohan et al. | 395/425 |
| 5,341,481 | 8/1994 | Tsukamoto | 395/325 |

FOREIGN PATENT DOCUMENTS 62-232062 10/1987 Japan .

*Primary Examiner*—Jack B. Harvey
*Assistant Examiner*—Michael A. Whitfield
*Attorney, Agent, or Firm*—Alan R. Loudermilk

[57] ABSTRACT

A physical space management table is disposed outside the microprocessor in order to hold attribute data of the regions of the physical space held as a set of a plurality of regions in a manner corresponding to the regions of the physical space. The microprocessor is provided with a physical space management unit which fetches the attribute data from the physical space management table and manages them. The physical space management unit includes a physical space management table search control circuit, and a physical data buffer which primarily holds the attribute data obtained by the physical space management table search control circuit and the physical address in a manner corresponded to each other.

19 Claims, 13 Drawing Sheets

FIG. 7

| DESIG-NATION OF BUS SIZE | DATA SIZE | AOR 30 | AOR 31 | BYTE CONTROL SIGNAL BC0 | BC1 | BC2 | BC3 | AOR ADDITION VALUE (ADD CONTROL) |
|---|---|---|---|---|---|---|---|---|
| 8 BIT | 8 BIT | × | × | ○ | — | — | — | +1 |
|  | 16 BIT | × | × | ○<br>○ | —<br>— | —<br>— | —<br>— | +1<br>+1 |
|  | 32 BIT | × | × | ○<br>○<br>○<br>○ | —<br>—<br>—<br>— | —<br>—<br>—<br>— | —<br>—<br>—<br>— | +1<br>+1<br>+1<br>+1 |
| 16 BIT | 8 BIT | × | 0 | ○ | — | — | — | +1 |
|  |  | × | 1 | — | ○ | — | — | +1 |
|  | 16 BIT | × | 0 | ○ | ○ | — | — | +2 |
|  |  | × | 1 | —<br>○ | ○<br>— | —<br>— | —<br>— | +1<br>+1 |
|  | 32 BIT | × | 0 | ○<br>○ | ○<br>○ | —<br>— | —<br>— | +2<br>+2 |
|  |  | × | 1 | —<br>○<br>○ | ○<br>○<br>— | —<br>—<br>— | —<br>—<br>— | +1<br>+2<br>+1 |
| 32 BIT | 8 BIT | 0 | 0 | ○ | — | — | — | +1 |
|  |  | 0 | 1 | — | ○ | — | — | +1 |
|  |  | 1 | 0 | — | — | ○ | — | +1 |
|  |  | 1 | 1 | — | — | — | ○ | +1 |
|  | 16 BIT | 0 | 0 | ○ | ○ | — | — | +2 |
|  |  | 0 | 1 | — | ○ | ○ | — | +2 |
|  |  | 1 | 0 | — | — | ○ | ○ | +2 |
|  |  | 1 | 1 | —<br>○ | —<br>— | —<br>— | ○<br>— | +1<br>+1 |
|  | 32 BIT | 0 | 0 | ○ | ○ | ○ | ○ | +4 |
|  |  | 0 | 1 | —<br>○ | ○<br>— | ○<br>— | ○<br>— | +3<br>+1 |
|  |  | 1 | 0 | —<br>○ | —<br>○ | ○<br>— | ○<br>— | +2<br>+2 |
|  |  | 1 | 1 | —<br>○ | —<br>○ | —<br>○ | ○<br>— | +1<br>+3 |

FIG. 8

| PTBR | | 22 | | | | | | | | | PHYSICAL ADDRESS |
|---|---|---|---|---|---|---|---|---|---|---|---|
| 0 | — | | 1 0 | WT | PP | WE | CB | NC | PE | 0 | 0xx···~ 3xx··· |
| 1 | — | | 1 0 | WT | PP | WE | CB | NC | PE | 0 | 4xx···~ 7xx··· |
| 2 | — | | 1 0 | WT | PP | WE | CB | NC | PE | 0 | 8xx···~ Bxx··· |
| 3 | PSTB | | — | — | — | — | — | — | — | 1 | Cxx···~ Fxx··· |
| | | | BS | | | | | | | CT | |

| PST | | 22 | | | | | | | | | |
|---|---|---|---|---|---|---|---|---|---|---|---|
| 0 | — | | 0 1 | WT | PP | WE | CB | NC | PE | 0 | C00···~ C03··· |
| 1 | — | | 0 1 | WT | PP | WE | CB | NC | PE | 0 | C04···~ C07··· |
| ... | | | | | | | | | | | |
| 191 | — | | 0 1 | WT | PP | WE | CB | NC | PE | 0 | EFC···~ EFF··· |
| 192 | — | | 0 0 | WT | PP | WE | CB | NC | PE | 0 | F00···~ F03··· |
| ... | | | | | | | | | | | |
| 255 | — | | 0 | OW | T | PP | WE | CB | NC | PE | 0 | FFC···~ FFF··· |
| | | | BS | | | | | | | CT | |

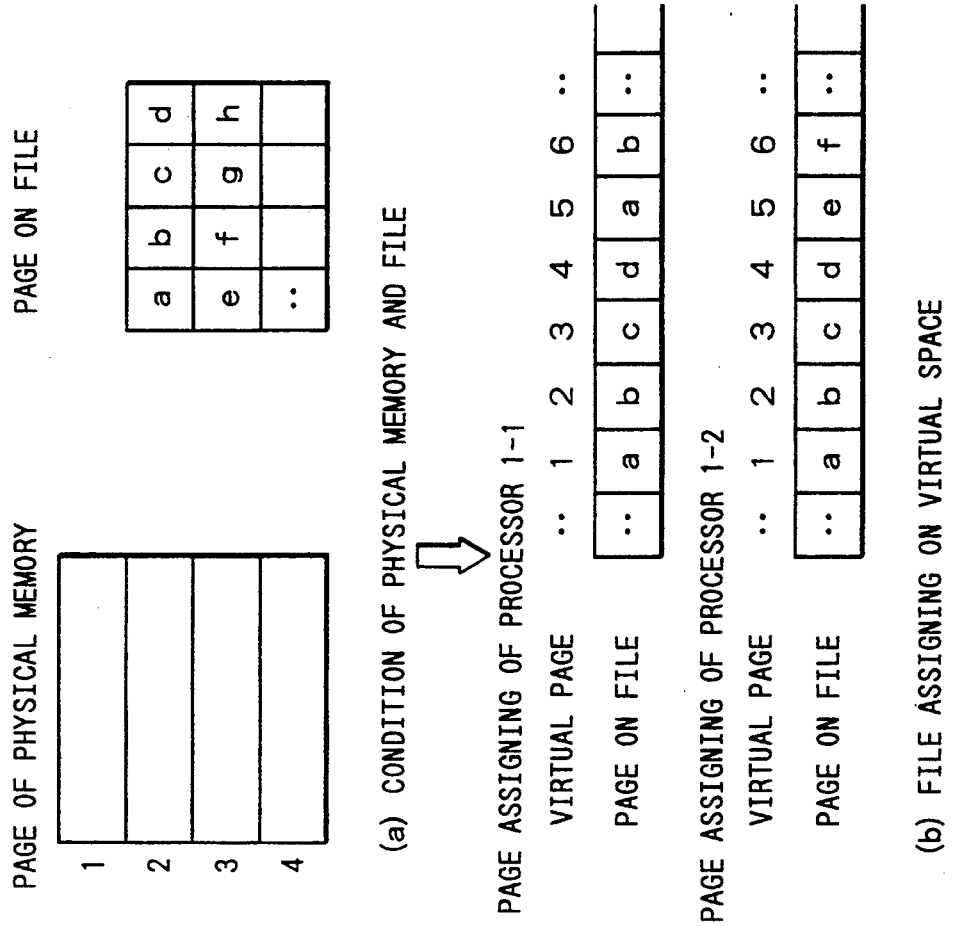

FIG. 12

| LAPSE OF TIME | 1 | 2 | 3 | 4 | 5 | ⑥ | 7 | 8 |
|---|---|---|---|---|---|---|---|---|
| VIRTUAL PAGE ACCESS OF PROCESSOR 1-1 | 1 R | 2 W | 3 R | 4 R | 5 W | 6 R | 1 R | 2 R |
| VIRTUAL PAGE ACCESS OF PROCESSOR 1-2 | — | — | 3 W | 4 R | 1 R | 2 R | 5 R | 6 R |

PHYSICAL MEMORY

| PAGE 1 | a | a | a | a | a | a | a | a |
|---|---|---|---|---|---|---|---|---|
| PAGE 2 |   | b | b | b | b | b | b | b |
| PAGE 3 |   |   | c | c | c | c | e | e |
| PAGE 4 |   |   |   | d | d | d | d | f |

(a) LAPSE OF PROCESSOR ACCESS AND PHYSICAL MEMORY ASSIGNING

⇩

M BIT OF PROCESSOR 1-1

| VIRTUAL PAGE | 1 | 2 | 3 | 4 | 5 | 6 |
|---|---|---|---|---|---|---|
| PAGE ON FILE | a | b | c | d | a | b |
| M BIT | 0 | 1 | 0 | 0 | 1 | 0 |

M BIT OF PROCESSOR 2

| VIRTUAL PAGE | 1 | 2 | 3 | 4 | 5 | 6 |
|---|---|---|---|---|---|---|
| PAGE ON FILE | a | b | c | d |   |   |
| M BIT | 0 | 0 | 1 | 0 |   |   |

(b) M BIT ON ADDRESS CONVERSION TABLE AFTER LAPSE OF TIME 6

⇩

| PHYSICAL PAGE | 1 | 2 | 3 | 4 |
|---|---|---|---|---|
| PAGE ON FILE | a | b | c | d |
| M BIT | 1 | 1 | 1 | 0 |

(c) M BIT ON PHYSICAL SPACE MANAGEMENT TABLE AT TIME ⑥

MICROPROCESSOR AND STORAGE MANAGEMENT SYSTEM HAVING SAID MICROPROCESSOR

BACKGROUND OF THE INVENTION

The present invention relates to a storage management system and to a microprocessor utilized for this system. More particularly, the invention relates to technology of managing attributes of physical space by using a physical space management table or technology that can be effectively adapted to a multiprocessor system having a logical space management (virtual storage management) system.

The size of a bus is one of the examples of an attribute related to physical space. FIG. 13 illustrates a memory map on physical space wherein most of the memories have a bus size (e.g., the number of bits that can be read or written at one time in parallel) of 32 bits but a ROM has a size of 16 bits and an input/output device (I/O) has a size of 8 bits. A method called dynamic bus sizing has been proposed to realize such a variable bus sizing. According to this method, when a processor makes access to the external bus, a bus controller provided on the external side returns a bus size for the address and the processor executes the processing according to the bus size. Since the data of bus sizes have been set to the external bus controller, access can be made without being brought to consciousness by a program even when the external bus has 16-bit devices and 32-bit devices (memories) in a mixed manner. Thus, the dynamic bus sizing is rich in flexibility in regard to the bus sizing but is not adapted to increasing the speed since the processor determines the address that is to be output in the next bus cycle depending upon the response from the external bus controller. Another example of an attribute related to physical space may be an address pipeline. This is a function which apparently reduces the access time of the memory by outputting a next address before the present bus access is completed. Like dynamic bus sizing, the conventional microprocessor responds to the processor in regard to whether the external bus controller is capable of establishing a pipeline to the address that is designated.

Technology for designating bus sizes at high speeds has been disclosed in, for example, Japanese Patent Laid-Open No. 232062/1987. According to this technology as shown in FIG. 14, a register is provided on a processor to designate a relationship between a physical address and a bus size, so that the bus size can be determined within the processor in response to the physical address. A port width holding register divides the physical address into several regions and holds bus sizes for the regions. The physical address is input to an address discrimination circuit which discriminates to which region it belongs and, then, the corresponding port width holding register reads out bus size data. Depending upon this result, a byte selection controller operates. Thus, the bus size is determined in the processor and the bus access is started making it easy to carry out the operation at high speeds.

Another attribute related to physical space may be reference/change data of physical page in the logical space management. That is, a logical space system including a primary memory accessible with a physical address and the magnetic disc as a secondary memory is corresponding to a page of the secondary memory and, when a page on the logical space does not exist on the primary memory, the page on the secondary memory is copied by an operating system and is executed. In this case, when there is no vacancy in the primary memory, some pages in the primary memory are saved in the secondary memory to provide room for a new page. This procedure takes place in accordance with the reference/change data of physical page. These data are generally prepared in a logic space management table. These data should be managed corresponding to physical space. However, since the logical space management table has been made present already, the data are provided in the logical space management table to make the constitution simple.

SUMMARY OF THE INVENTION

Address pipelining and variable bus sizing cannot be simultaneously carried out with a system in which the external bus controller responds. This is because, in the address pipeline, the address of the next cycle must be prepared in advance and the next bus cycle must be started as soon as the bus controller responds. In dynamic bus sizing, however, the address of the next bus cycle is determined by a response from the external bus controller and, then, addition of addresses is carried out, which is not in time with the bus timing of the address pipeline.

In the case of a bus size designation method according to which the processor contains a bus width holding register, there exists a limitation in the number of registers and the size of the regions to be managed becomes too great. For instance, when the processor has an address space of 4 G bytes, and has sixteen registers as a bus width holding register and when the address space is designated being equally divided by sixteen registers, then each region has a size of 256M bytes. In general, however, the number of memory bytes that are mounted is from several megabytes to several tens of megabytes as a whole though it may increase year after year. With the method designated by the registers, therefore, it is difficult to manage the physical space as finely as those which are required thus far.

Moreover, reference/change data of physical page in the logical space management are heretofore provided in the logical space management table. However, when the page is shared to allocate the same physical address to different addresses on the logical space and when the individual processors use separate logical space management tables in the multiprocessor constitution, a plurality of reference/change data are corresponding to one physical address. Though the management in such a case has heretofore been carried out by the operating system, the management for the multiprocessor becomes complex and difficult.

The object of the present invention is to provide a storage management system which is capable of managing attribute data related to physical space such as reference/change data used for the bus sizing and for replacing pages in a virtual storage system maintaining fineness or resolution required for the system no matter how finely the physical space is mapped according to the required specifications of the system and application, and to provide a microprocessor that is adapted to this system.

Another object of the present invention is to provide a storage management system in which constitution for managing attribute related to physical space does not greatly increase the chip area of the microprocessor and does not sacrifice the rate of instruction formation which utilizes the attribute data, and to provide a microprocessor adapted to this system.

A further object of the present invention is to provide a storage management system which is capable of effecting the address pipeline processing and the variable bus sizing processing in parallel with each other, and to provide a microprocessor adapted to this system.

A still further object of the present invention is to provide a storage management system which, when a page is shared to allocate the same physical address to different addresses on logical space and when the individual processors use separate logical space management tables in the multiprocessor constitution, makes it relatively easy to manage the physical space without developing a discrepancy that may be caused when a plurality of reference/change data are corresponded to one physical address and simplifies the processing related to the replacement of pages, and to provide a microprocessor adapted to this system.

The above as well as other objects and novel features of the present invention will become obvious from the description of the specification and the accompanying drawings.

Briefly described below is the outline of a representative example of the invention disclosed in this application.

That is, in a system for supporting the virtual storage, a physical space management table is arranged on the external side of the microprocessor in order to hold attribute data of regions of physical space grasped as a set of a plurality of regions in a manner corresponding to the regions of the physical space. The microprocessor is provided with a physical space management means which takes out attribute data from the physical space management table and manages them.

In order to increase the processing speed of attribute management, the physical space management means can include a physical space management table retrieval control means and a physical data buffer means which primarily holds the attribute data obtained by the physical space management table search control means and the physical addresses in a manner corresponding to each other.

When the attribute date are the ones that are fixedly determined according to the hardware constitution of the system like bus sizing data for the variable bus sizing, the physical space management table search control means has a function of retrieving attribute data corresponding to the physical address from the physical space management table prior to the external access by the physical address in case entry corresponding to the physical address does not exist in the physical data buffer means.

The bus size data are fed to a bus control unit in the microprocessor. Based on the bus size data, the bus control unit outputs a signal for designating the bus size to units inside and outside the microprocessor.

When the page replacement is taken into consideration between the physical space as primary memory and the peripheral storage unit as secondary memory, the attribute data includes reference data that indicates whether reference is made to the data for the regions on the physical space and change data that indicates whether data is changed for the regions on the physical space. Here, the physical space management table search control means has a function of rewriting attribute data included in the data of the physical space management table and in said physical data buffer means.

In order to increase the memory utilization efficiency of the physical space management table and to very finely manage the attribute data for the physical space, there should be employed a table of the structure of a plurality of levels such as a physical section table or a physical page table as a physical space management table. The physical space management table search control means has one or more base registers for designating address of the physical space management table and further has a function of retrieving the physical space management table based on a value obtained by calculating the value of the base register and some physical addresses and/or based on a value obtained by calculating the above value and part or whole of the remainder of the physical addresses.

According to the above-mentioned means, any attribute data required depending upon the condition of utilizing physical space or upon the mapping condition can be arranged in the physical space management table disposed outside the microprocessor irrespective of the memory capacity in the microprocessor. This makes it possible to manage the attribute data related to physical space such as reference and change data utilized for the bus sizing and for replacing pages maintaining fineness or resolution required by the system no matter how finely the physical region is mapped according to the required specification of the system or the application.

The microprocessor has a buffer means which primarily holds attribute data retrieved from the physical space management table in a manner corresponding to physical addresses, and utilizes the attribute data at the time of access operation when the buffer means has an effective entry that corresponds to the physical address. This means that the constitution for managing the attribute related to physical space works to increase the rate of instruction formation for utilizing attribute data such as bus size data without greatly increasing the chip area of the microprocessor.

The attribute data are managed corresponding directly to the physical space, and one reference/change data corresponds to one physical address even when a page is shared to allocate the same physical address to different addresses on the logical space or even separate logical space management tables are used by the individual processors in the multiprocessor constitution. This makes it very easy to manage the reference/change data without developing discrepancy between the reference/change data and the physical address.

BRIEF DESCRIPTION OF THE DRAWINGS

FIG. 7 is a diagram explaining how the data in the microprocessor are output to the bus depending upon the designation of bus size;

FIG. 8 is a diagram explaining a setting of a physical management table for the memory constitution of FIG. 6;

FIG. 11 is a diagram showing the condition of file assignment in the multiprocessor system which carries out logical space management in the system constitution of FIG. 10;

FIG. 12 is a diagram showing the condition using physical memory in the file assignment of FIG. 11 and the condition of setting the change bits M;

DESCRIPTION OF THE PREFERRED EMBODIMENTS

The storage management system and the physical space management system according to an embodiment of the present invention will now be described.

[1] Outline of Storage Management

Figure 1:
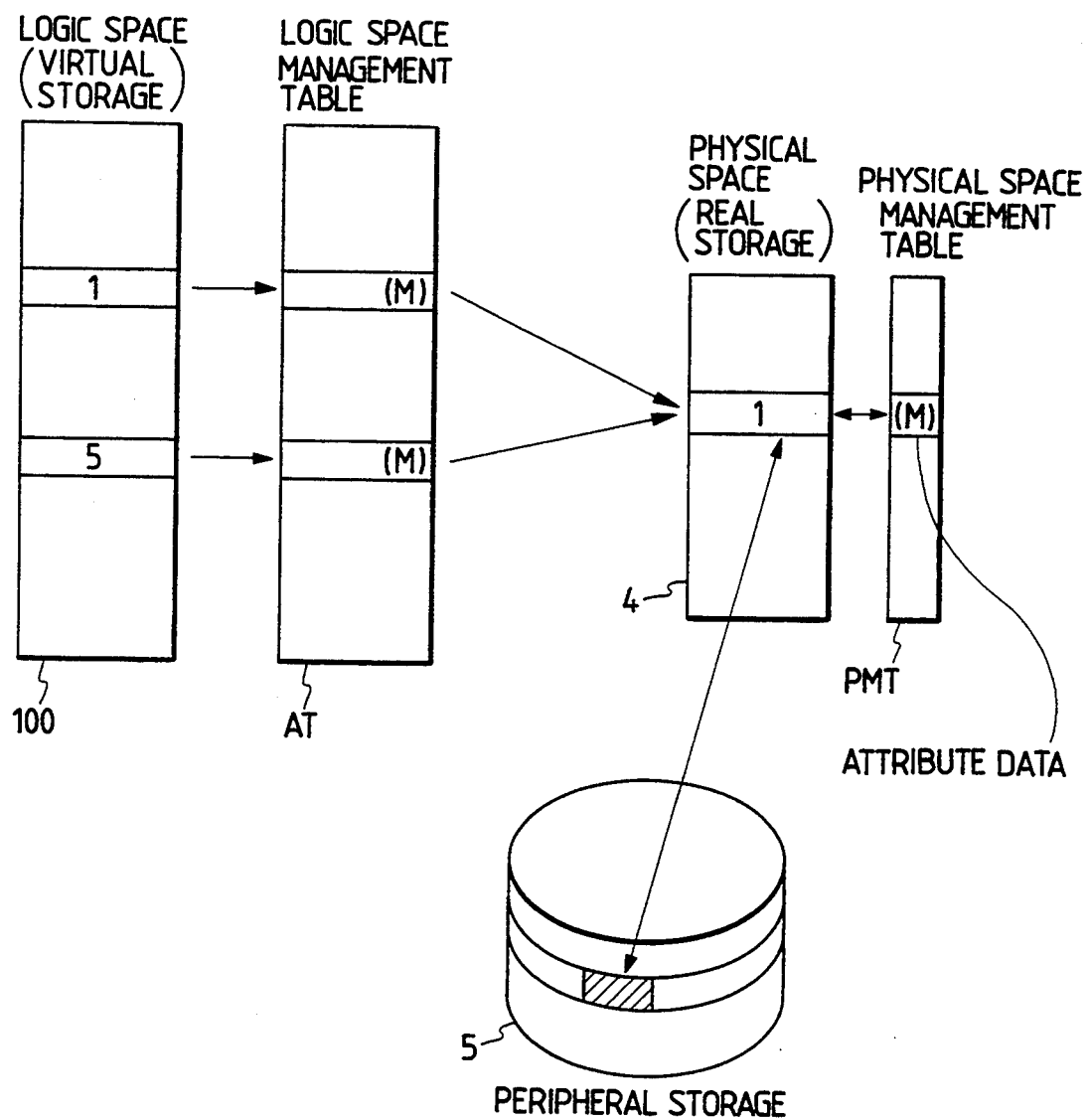
FIG. 1 is a diagram explaining the outline of storage management to which the present invention is applied.

FIG. 1 shows the outline of storage management to which the present invention is adapted, and wherein reference numeral 100 denotes a logical space (virtual storage) that serves as a virtual storage space and that is expressed by logical addresses (virtual addresses) on the architecture, 4 denotes a physical space (real storage) that exists as hardware and that is referred to by physical addresses (real addresses), 5 denotes a peripheral storage such as a magnetic disc device, and symbol AT denotes a logical space management table which shows a relationship between logical addresses on the logical space and physical addresses on the physical space and which, at the time of address translation, makes reference to the contents in the logical space management table AT and translates logical address into physical address. In this storage management, the physical space 4 to which access is made with physical address is referred to as primary memory and the peripheral storage 5 is referred to as secondary memory. Though there is no particular limitation, the logical space 100 is corresponding to a page of the secondary memory 5. When the page on the logical space 100 does not exist on the primary memory 4, the page on the secondary memory 5 is taken in onto the primary memory 4 by the interposition of, for example, the operating system. In this case, when there is no vacancy in the primary memory 4, some pages are saved in the secondary memory 5 and new pages are inserted therein. Reference data and change data of physical page are utilized to replace the pages. The reference data are those which indicate whether reference is made to the stored data on the physical space 4, and the change data are those which indicate whether the stored data are rewritten or not on the primary memory 4. At the time of replacing the pages, if there is a page which is neither referred to nor changed, the contents thereof are not saved but are expelled out of the physical space 4. When a page that is changed is to be expelled, on the other hand, the contents thereof are saved. The reference/change data of physical page are used as attribute data related to the physical space 4 together with bus size data that will be described later. The attribute data are held by a physical space management table PMT corresponding to physical addresses. The physical space management table PMT is constituted on the physical space 4 independently of the logical space management table AT and updates predetermined attribute data depending upon the conditions of writing onto corresponding physical addresses.

As described above, the attribute data are managed directly corresponding to the physical space 4. Therefore, when the page is shared to allocate the same physical address to different addresses on the logical space or when the separate logical space management tables are used by the individual processors in the multiprocessor constitution one reference/change data is corresponding to one physical address. On the other hand, when reference/change data of physical address in the logical space management are managed corresponding to the logic addresses in the logical space management table in a customary manner, a plurality of reference/change data must correspond to one physical address under the condition where the page is shared or where the separate logical space management tables are used by the individual processors in the multiprocessor constitution. Accordingly, the storage management of this embodiment makes it very easy to manage the reference/change data without developing discrepancy between the reference/change data and the physical addresses. The page is shared when different logical pages are assigned to the same physical page as a result of, for example, starting a small process.

[2] Storage Management System

Figure 2:
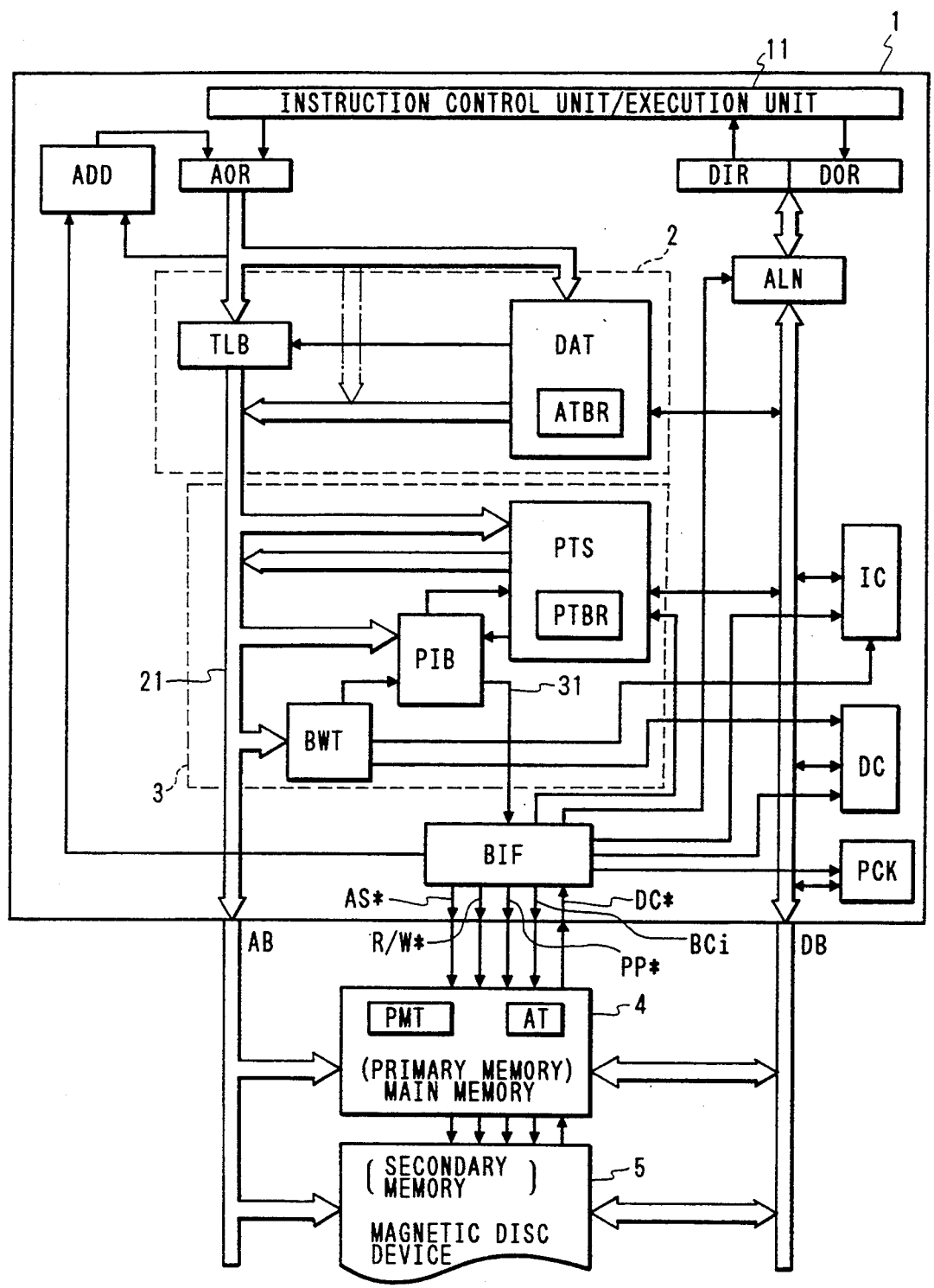
FIG. 2 is a block diagram of a storage management system according to an embodiment of the present invention to which the storage management shown in FIG. 1 is adapted.

FIG. 2 illustrates a storage management system according to an embodiment of the present invention to which is adapted the storage management that is shown in FIG. 1, and wherein reference numeral 1 denotes a microprocessor fabricated in the form of a semiconductor chip by the well-known semiconductor production technology, 4 denotes a main memory which serves as a primary memory, and reference numeral 5 denotes a magnetic disc device which serves as a secondary memory. The main memory 4 exists as hardware, and is positioned as a physical space that is referred to with a physical address and stands in FIG. 2 for a general memory which constitutes operation region, primary memory region of data and buffer region for the peripheral circuits. The microprocessor 1 supports the logical space which is a virtual storage space expressed by logical addresses on the architecture, and has a logical space management mechanism 2 which is a mechanism for the logical space management for translating a logical address into a physical address. There is further provided a physical space management system 3 to manage attribute data related to physical space such as reference/change data of physical page and bus size data that will be described later in a manner corresponding to physical addresses. The logical space management table AT for the logical space management and the physical space management table PMT for the physical space management, are prepared in advance and are arranged on predetermined memory regions of the main memory 4.

In the microprocessor 1, a functional block designated at 11 is an instruction control execution unit which includes an instruction control unit and an execution unit. The instruction control unit fetches and decodes the instruction according to a predetermined procedure and gives suitable control signals to the execution unit and other portions depending upon the decoded result. The execution unit has an arithmetic unit and a storage unit and performs various operations to process the data being controlled by the instruction control unit. The data necessary for processing a variety of data are exchanged relative to the external units via a data bus DB. For this purpose, there are provided a data input register DIR, a data output register DOR and an aligner ALN. When, for instance, the data bus DB has 32 bits and the registers IDR, DOR have 32 bits, respectively, the aligner ALN replaces the upper 16 bits by the lower 16 bits that are included in 32 bits between the input side thereof and the output side thereof. In FIG. 2, symbol 1C denotes an instruction cache memory, DC denotes a data cache memory and PCK denotes a circuit for checking the parity of the transferred data.

A bus control unit BIF outputs an address strobe signal AS* (hereinafter, a mark * represents low enable) which indicates that an effective address is sent out, outputs a read/write signal R/W* which indicates either reading or writing, outputs a pipeline signal PP* which indicates whether the pipeline of bus be effected or not, and outputs a byte control signal BCi (e.g., a 4-bit signal with i=0 to 3 in tie case of a 32-bit bus) that indicates validity of data on the data bus with, for example, a byte as a unit, and inputs a date transfer completion signal DC* that indicates the completion of data transfer from the external unit. The bus control unit BIF further outputs a signal for carrying out the control operation in the processor. When the data are to be continuously transferred, the addition data are sent to an address adder ADD depending upon the bus size, the value held by an address output register AOR is increased by a predetermined number, and an address that is to be output in the next bus cycle is formed automatically. A predetermined attribute data 31 is given from the physical space management system 3 to the bus control unit BIF and is used for forming, for example, the above-mentioned byte control signal BCi.

When the main memory 4 assumes the reading operation in response to an address signal output from the microprocessor 1 to the address bus AB and a bus control signal output from the bus control unit BIF, the read data is taken in by the microprocessor 1 via the data bus DB. The data are sent to the data input register DIR while effective data only on the data bus are picked up by the aligner ALN according to bus size data from the bus control unit BIF. Under the fetch permit condition to the cache memory, furthermore, the data are fetched by the data cache memory DC, too. Therefore, when the access is made thereafter with the same address, the external access is not effected and the data are read out from the data cache memory DC. The data fetch permit/non-permit to the cache memory can be designated by a physical data buffer PIB as one of attribute data 31.

When the writing operation is designated to the main memory 4 by an address signal output to the address bus AB from the microprocessor 1 and a bus control signal output from the bus control unit BIF, the write data are set to the date output register DOR and are output being placed on an effective byte position on the data bus by the aligner ALN according to bus size data from the bus control unit BIF. When the address of writing destination exists on the data cache memory DC, the data are simultaneously written onto the data cache memory DC, too. At the time of reading the data, the parity check system PCK checks parity of the data bus and adds parity bit to the data on the data bus when the data are written.

The same operation as that of reading the data mentioned above is carried out even at the time of reading instructions. Though not diagramed, in many cases, the instructions are generally directly transferred to the instruction fetch system of the instruction control unit without passing through the aligner ALN. Furthermore, though not diagramed, physical addresses are generally input to the instruction cache memory IC and to the data cache memory DC.

[3] Logic Space Management

The address data formed by the instruction control execution unit 11 are set to the address output register AOR. The logical space management system 2 functions when the logical space management is carried out. In this case, the address data held by the address output register AOR are interpreted as logical address and translated into physical addresses by the logical space management mechanism 2.

As shown in FIG. 2, the logical space management system 2 is constituted by a dynamic address translator DAT for retrieving the logical space management table (address translation table) AT for translating logical addresses into physical addresses, and an address translation buffer TLB for temporarily storing the relation pairs of the obtained logical addresses and physical addresses. The logic address output from the address output register AOR is fetched by the address translation buffer TLB. When the fetched logical address is in agreement with one in the address translation buffer TLB, the physical address is obtained from the corresponding relation pair and a physical address 21 is output from the address translation buffer TLB. When the fetched logical address has not been registered in the address translation buffer TLB, a logical space management table AT designated by an address translation table base register ATBR is retrieved by the dynamic address translator DAT, and the result obtained by the retrieval is registered to the address translation buffer TLB through the data bus DB and, then, the physical address 21 is output from the address translation buffer TLB in the same manner as described above. When the microprocessor 1 is not executing the logical space management, the content of the address output register AOR is output as a physical address by-passing the address translation buffer TLB as indicated by arrow of a dot-dash chain line. The thus obtained physical address 21 is directly output to the address bus AB.

Figure 3:
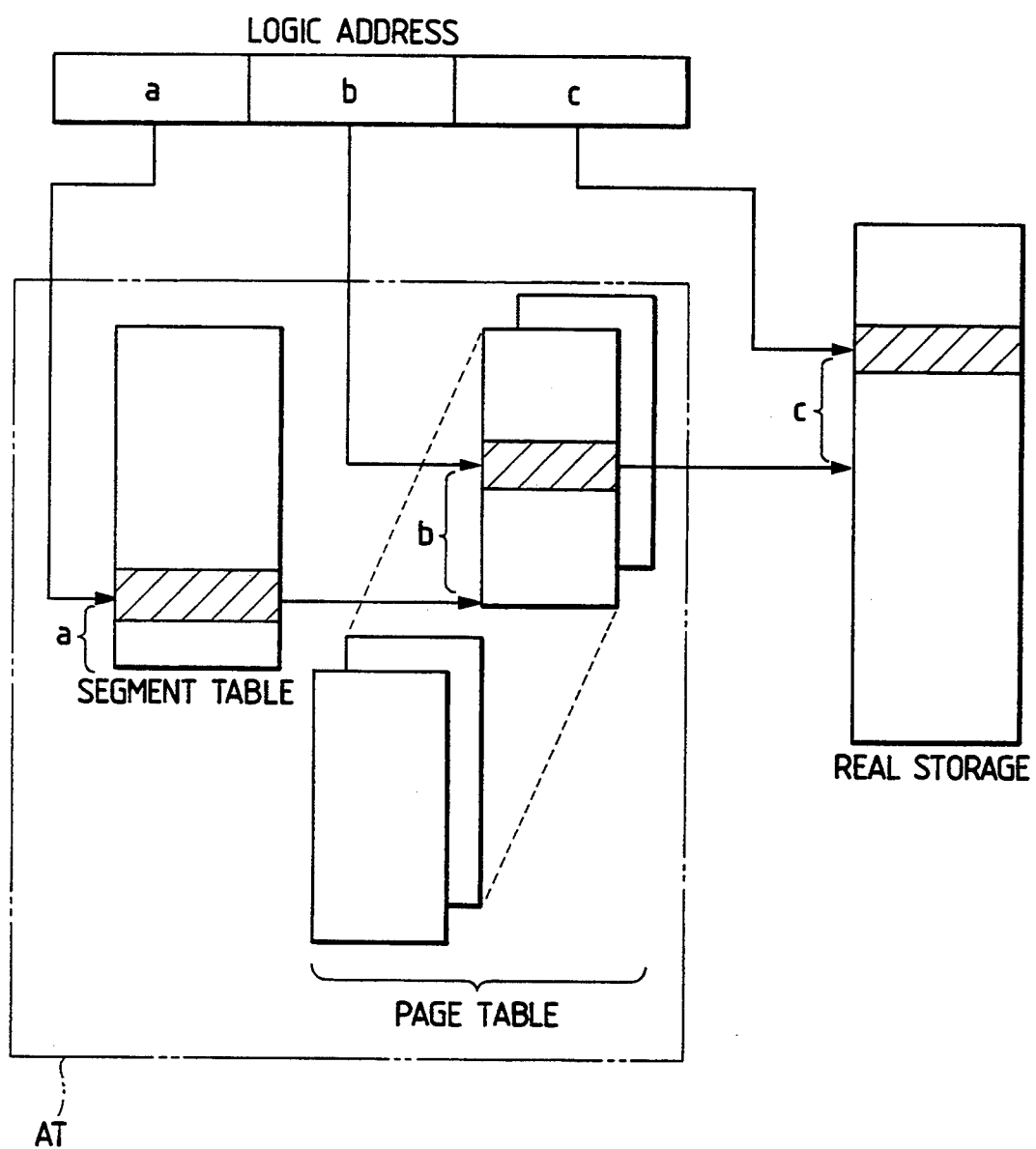
FIG. 3 is a diagram explaining a two-level paging system which is an address translation system in the logical space management.

Here, though there is no particular limitation, the address translation in the logical space management may employ a two-level paging system shown in FIG. 3. This system is based on the two-step segmentation; i.e., the logical space is divided into large segments which are then further divided with a page as a unit. The logical space management table AT of FIG. 3 is constituted of a segment table and a page table.

The logical address has a segment index filed a, a page index field b and an offset field c.

When an address corresponding to the logical address from the address output register AOR has not been registered to the address translation buffer TLB, the table AT is retrieved by the dynamic address translator DAT. That is, the address data of the segment index field a is added to the address data that has been set in advance to the address translation table base register ATBR, and access is made to the main memory 4 with the data obtained by this addition as an address. The address data read out by this access and the address data of the page index field b are added up together, and access is made again to the main memory 4 with the data obtained by this addition as an address. The address data read out by this access and the address data of the offset field c are added up together, to obtain a physical address for making access to the main memory which is a real memory. A pair of this physical address and the above logical address are registered to the address translation buffer TLB. This physical address is used for making access to the real memory.

[4] Physical Space Management

The physical management system 3 inputs the physical address 21 formed by the logical space management or inputs the physical address 21 output from the instruction control execution unit 11, and works to obtain attribute data that corresponds to the physical address or to correct attribute data as required. The physical space management system 3 is constituted of a physical table search control PTS that searches the physical space management table PMT including attribute data corresponding to physical address and that rewrites attribute data as required, and a physical data buffer PIB which temporarily stores a relation pair of the obtained physical address and the attribute data. The physical data buffer PIB discriminates whether the physical address 21 fed thereto is in agreement with one in the physical data buffer PIB or not and, when they are in agreement with each other, outputs an attribute data 31 obtained from a corresponding pair to the bus control unit BIF and the like. Depending upon the attribute data, the bus control unit BIF controls the interior of the microprocessor 1 or forms a control signal for the external bus. When the physical address 21 has not been registered in the physical data buffer PIB, the physical address 21 is temporarily interrupted from being output, the physical space management table PMT designated by the physical space management table base register PTBR is retrieved by the physical table search control PTS, the result of retrieval is registered to the physical data buffer PIB via the data bus DB and physical table search control PTS and, then, the physical address 21 is output again, and the attribute data 31 is obtained from the physical data buffer PIB in the same manner as described above and is given to the bus control unit BIF. When access is made to the main memory 4 by the physical address signal 21 and the control signal output from the bus control unit BIF, attribute data such as reference data and change data are rewritten as required depending upon whether the access is for reading or writing. In this case, the contents of the physical data buffer PIB are maintained in match with the contents of the physical space management table PMT. That is, whenever the attribute data of the physical data buffer PIB are rewritten, the attribute data of the physical space management table PMT corresponding thereto are changed.

Symbol BWT denotes a bus watcher. Though there is no particular limitation, a module is provided on the outside of the microprocessor 1 and gains the right of using the bus to serve as a bus master and operates to write data onto the main memory 4. In this case, the bus watcher BWT fetches the address on the address bus during the writing cycle, and forms signals for designating correction of entries in the physical data buffer PIB, in the instruction cache memory IC, and in the data cache memory DC in order to maintain matching of stored data among the physical data buffer PIB, instruction cache memory IC and data cache memory DC.

[5] Physical Space Management Table

Figure 4:
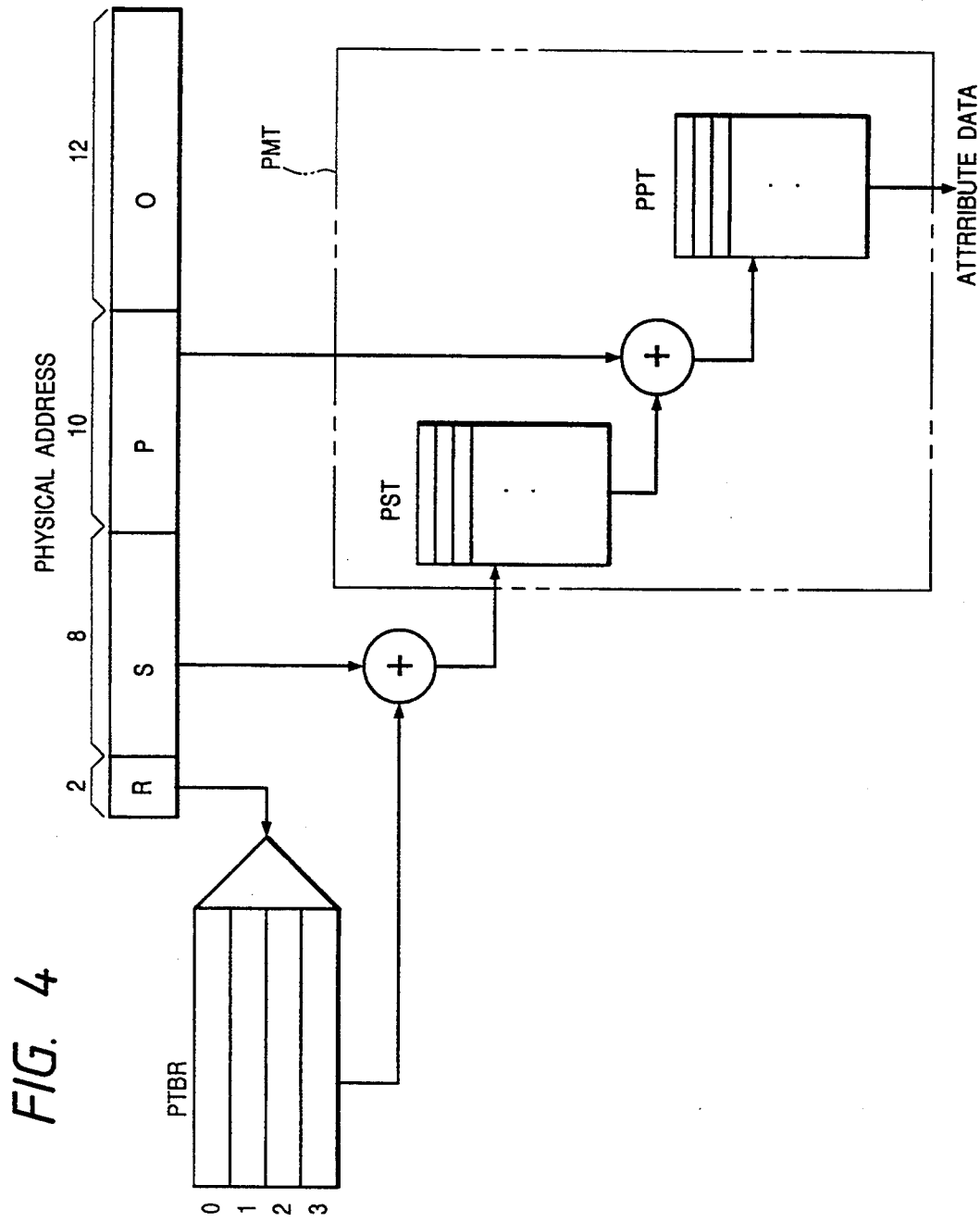
FIG. 4 is a diagram explaining the structure of a physical space management table and a method of retrieval.

FIG. 4 illustrates the structure of the physical space management table PMT and a method of retrieval. Here, the physical address 21 consists of 32 bits. The physical address 21 is divided into 2, 8, 10 and 12 bits from the upper side. The physical address 21 consisting of 32 bits makes it possible to make access to physical space of 4 G bytes. In this embodiment, the physical space of 4 G bytes is divided into four which are designated by the higher two bits of the physical address 21. That is, the upper two bits divide the physical address space into regions (large regions) each consisting of 1 G bytes. A physical space management table base register PTBR is assigned to each of the four regions (large regions), and a head address of the corresponding physical space management table PMT is held in each of the table base registers PTBR. Each of the four regions (large regions) is further divided into sections (intermediate regions) of 4M bytes. The section (intermediate region) is expressed by the next 8 bits of the physical address 21. Each section is further divided into pages (small regions) of 4 k bytes. The page is expressed by the next 10 bits of the physical address 21. In this embodiment, the physical space management table PMT is constitutes in two stages, i.e., constituted of the physical section table PST and the physical page table PPT. The physical space management table base register PTBR designates the head address of the physical section table PST. Further, the physical section table PST includes head addresses of a plurality of physical page tables PPT. The table search for a given physical address is carried out as described below. First, one of the four physical space management table base registers PTBR is selected by the upper two bits R of the physical address 21. A value held in the selected table base register and the next 8 bits S of the physical address are added up together in order to form an address that designates a desired entry in the physical section table PST. Further, a value held in the entry selected by the address and the next 10 bits P of the physical address are added together to form an address that designates a desired entry in the physical page table PPT. The attribute data is described on the entry in the page table PPT selected by the address, and the microprocessor 1 reads the content thereof and holds the pair of the above physical address and the above attribute data in the physical data buffer PIB to use it. The addition operation is carried out by the physical table search control PTS. In the case of this embodiment, the number of entries of the physical section table PST is eighth power of two, i.e., 256 entries, and the number of entries of the physical page tables PPT is tenth power of two, i.e., 1024 entries. If one entry of the physical section table PST consists of four bytes and one entry of the physical page table PPT consists of one byte, then the physical section table PST and the physical page table PPT both have a table size of 1 k bytes, which is suitable for management. Moreover, the entry of the section table PST designates the head address of a page table, and 256 page tables are corresponding to one section table.

[6] Constitution of Entries of Physical Space Management Table

Figure 5A:
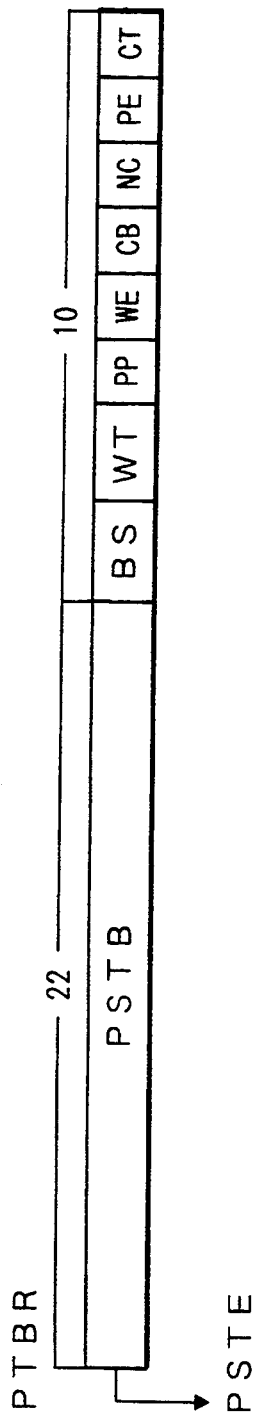
FIGS. 5a, 5b, and 5c are a diagram illustrating the structures of respectives entries which constitutes the physical space management table.
Figure 5B:
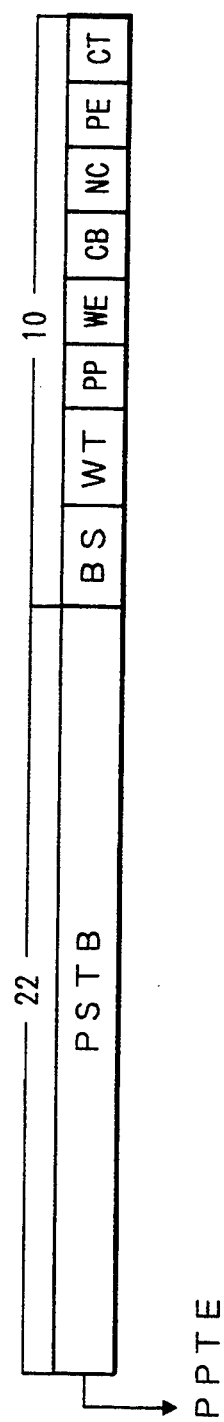
Figure 5C:
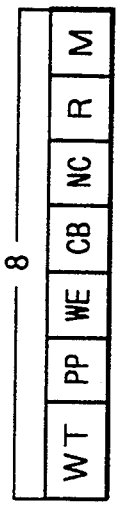

FIGS. 5a, 5b, and 5c illustrate the structure of entries constituting the physical space management table. As shown in FIG. 5(A), each physical space management table base register PTBR consists of 32 bits. A physical section table base PSTB that indicates the head address of the physical section table PST has been set to the upper 22 bits. When access is made to the physical section table PST, it is regarded that the lower 10 bits are all zero. It is therefore possible to place the physical section table PST with 1 k bytes as a unit. The lower 10 bits have contents as described below.

There are two bits BS that designate the bus size. For instance, BS=00 designates 8 bits, 01 designates 16 bits, 10 designates 32 bits and 11 designates 64 bits.

Similarly, there are two bits WT that designate wait at the time of memory access. For instance, WT= 00 designates no wait, 01 designates 1 wait, 10 designates 2 waits, and 11 designates to wait for a data transfer completion signal from the external unit. As the processor operates at a high speed, there exists no margin for preparing a data transfer completion signal on the external side. Therefore, it inevitably becomes necessary to introduce wait despite the processor and the memory are operating at high speeds. In such a case, if the number of wait is designated in advance for the high-speed memory, it becomes possible to operate the processor and the memory with their maximum performance.

A bit PP designates whether the pipeline operation (address pipeline) of bus be carried out or not. The bit PP=0 designates no pipeline operation, and PP=1 designates pipeline operation. Execution of the bus pipeline requests that the address be latched within, for example, two clocks on the external side. Therefore, as the address is output for a predetermined period of time, the microprocessor 1 is allowed to output the next address without waiting for the completion of the bus cycle. The external unit is allowed to know the next address in advance and makes ready for response at an early time, enabling the system as a whole to be operated at a high speed.

A bit WE designates the permit of write access. When WE=0, the write is inhibited. When WE=1, the write is permitted. When it is attempted to write data on the address of WE=0, the processor generates an exception of memory protection violation. This function is valid for protecting the data.

A bit CB designates whether the copy back (write back) of cache memory be executed or not. When CB=0, the copy back is inhibited. When CB=1, the copy back is executed. The cache memory to be treated may be either the one embedded in the microprocessor 1 or the one connected to the external unit. For instance, copy back is inhibited for the memory whose logical space is to be managed, and the copy back is executed for the data of stack or task.

A bit NC controls the data fetch by the cache memory. Fetch is permitted when NC=0 and is inhibited when NC=1. Fetch by the cache memory must be inhibited for the memory shared in the multiprocessor or for the addresses assigned to the input/output devices.

A bit PE is a parity enable bit. Parity is not checked and parity is not added when PE=0, and parity is checked and is added when PE=1.

A bit CT indicates if there is the physical section table PST. When CT=0, there exists no physical section table PST for the entry. When CT=1, the physical section table PST continues. When the attribute is the same for the whole 1 G bytes that manage the physical space management table base register PTBR while using the bit CT, there is no need of preparing the physical section table PST or the physical page table PPT; i.e., the memory is saved and the user is liberated from the labor of preparing a number of tables of the same content. When the bit CT is 1, the data are all neglected from BS to PE in the physical space management table base register PTBR, and the contents in the subsequent table (physical section table PST) become valid.

Referring to FIG. 5(B), the physical section table entry (an entry of the physical section table PST) PSTE has the same contents as that of the physical space management table base register PTBR, but the difference is that the upper 22 bits form a head address of the physical page table PPT. As will be described later, the bits BS and PE are deleted from the physical page table entry PPTE. As for these data (BS, PE), therefore, the description of physical section table entry PSTE becomes valid even when CT is 1 in the entry of the physical section table.

Referring to FIG. 5(c), the physical page table entry (an entry of the physical page table PPT) consists of 8 bits unlike those described above. There is no table address of the next stage and no bit CT that indicates continuation to the next stage. Further, a reference bit R and a change bit M are added as attribute data related to logical space that must be held for each of the pages. As a result, the entry consists of 11 bits. Here, however, the data of a total of three bits BS, PE are deleted, such that the entry consists of 8 bits. This makes it possible to suppress the physical page table to 1 k bytes which is half the size. The page table entry PPTE does not contain data BS, PE, and is managed with a minimum of 4M bytes as a unit without imposing no trouble in general use.

[7] Bus Sizing

Figure 6:
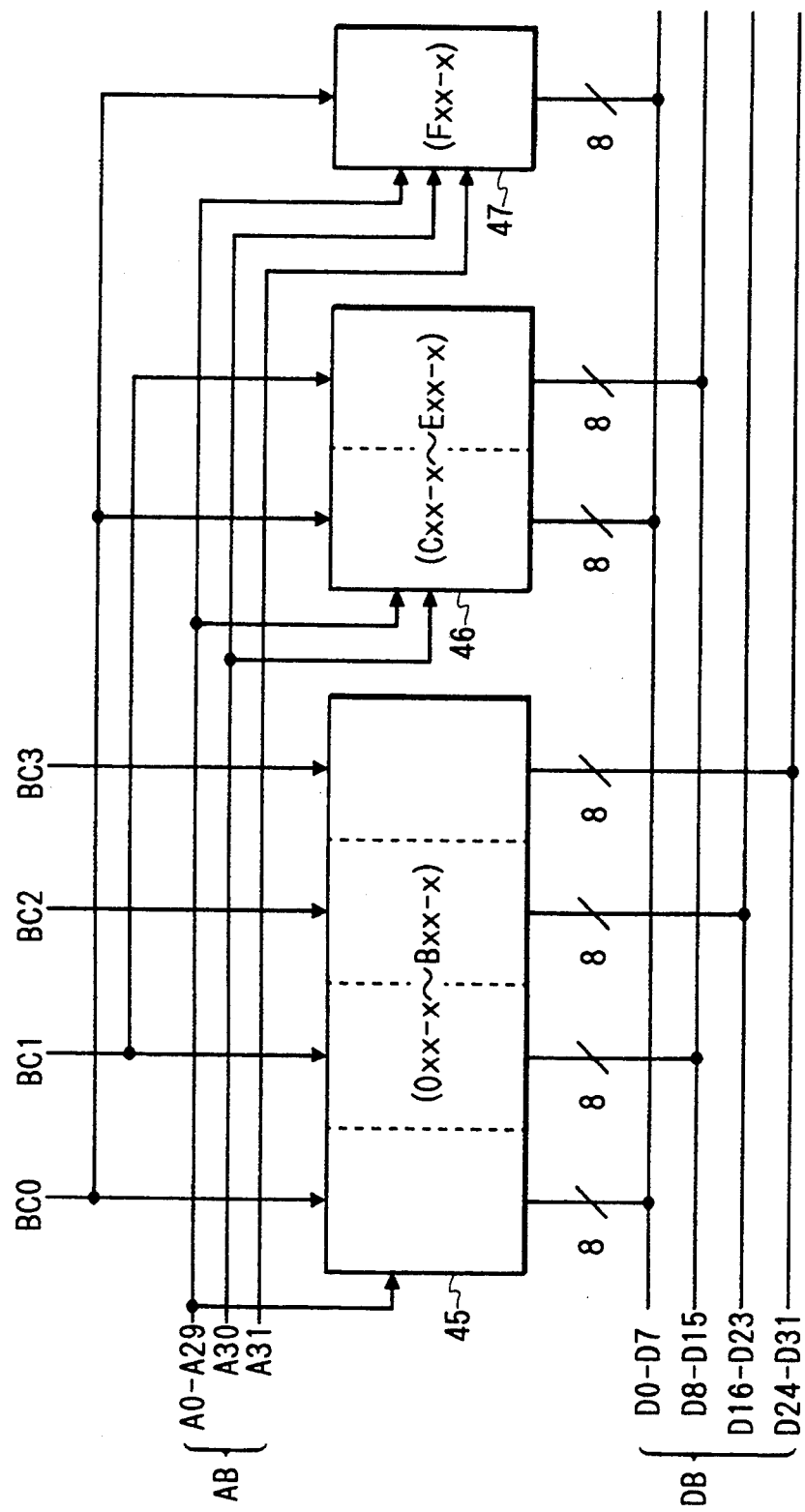
FIG. 6 is a diagram explaining the constitution of a memory of when the bus size is managed by the physical space management table.

FIG. 6 illustrates the constitution of a memory of when the bus size is to be managed by the physical space management table PMT. Memories 45, 46 and 47 constituting the main memory 4 have bus sizes of 32, 16 and 8 bits, respectively. In, for example, a hexadecimal notation, furthermore, the memory addresses are assigned from Oxx-x to Bxx-x for the memory 45, from Cxx-x to Exx-x for the memory 46 and Fxx-x for the memory 47. Byte control signals BC0 to BC3 indicating effective byte positions on the data bus are input to the memories from the microprocessor 1. The memories are constituted with a byte as a unit. The memory 45 has a function to respond to each of the byte control signals BC0 to BC3. The memory 46 responds to the signals BC0 and BC1 only.

FIG. 7 illustrates how the data in the microprocessor 1 are output to the bus DB in response to the bus size designation. Considered below is the case where, for example, the bus size designation consists of 16 bits, date in the processor consists of 32 bits, and the write address set to the address output register AOR is -xx1. Since the bus size designation consists of 16 bits, the effective byte positions of data bus correspond to byte control signals BC0 and BC1. In this case, the bus operates as described below. In the first bus cycle, BC1 only is asserted and the data of the first one byte are output to corresponding byte positions (D8–D15) on the data bus. Next, the address output register AOR is increased by +1, where BC0 and BC1 are asserted, and the data which follows the above first one-byte data are output to the corresponding byte positions (D0–D7, D8–D15). The address output register AOR is increased by +2, the byte control signal BC0 only is asserted in the final bus cycle, and the data of the final one byte are output to the corresponding byte positions (D0–D7). Though in the foregoing was described the case of writing data, the same holds true even in the case of reading data.

FIG. 8 illustrates an example of setting a table to meet the memory constitution of FIG. 6. In the example of FIG. 8, the table is set by giving attention to controlling the bus size only. The physical space of 3 G bytes has a width of 32 bits from the address 0xx- to the address Bxx- as shown in FIG. 6. As described above, furthermore, the physical space management table base register PTBR manages 1 G bytes and, hence, the bus sizes can be designated by PTBR0 to PTBR2 for the addresses of the above range. According to this example of setting, no physical space management table is required for the physical space of 3 G bytes. Therefore, the bit CT=0 is set, and a bus size (10) that designates the width of 32 bits is set to the fields BS of the base registers PTBR0 to PTBR2.

On the other hand, 768M bytes of from the address Cxx- to the address Exx- have a width of 16 bits and 256M bytes of the address Fxx- have a width of 8 bits, and cannot be designated by only the physical space management table base register PTBR having a management unit of 1 G bytes. Therefore, the base register PTBR3 declares the use of a physical space management table with a field CT=1 and sets the head address of the physical section table PST to the PSTB. In this case, other data of PTBR3 become invalid. In the physical section table PST, the management range of one entry consists of 4M bytes. Therefore, the bus size of 16 bits is designated for PSTE0 through up to PSTE191 and a bus size of 8 bits is designated for PSTE192 through up to PSTE255. In this case, the physical page table PPT is not required, and the field CT should be set to 0 in each entry PSTE.

In FIG. 8, the table is set by giving attention to setting the bus size only. In practice, however, the table is constituted more finely since there exist other attribute data. In this case, the physical region that does not need physical page table lies outside the page replacement region that is desired to be present fixedly on the physical memory such as the I/O addresses; i.e., the physical region that is managed with the bit CT being set to 0 on the physical section table or on the physical space management table base register, lies outside the page replacement region that is desired to be present fixedly on the physical memory such as the I/O addresses. According to this embodiment, the physical region that lies outside the page replacement region requires neither the reference bit R nor the change bit M.

[8] Address Pipeline

Figure 9:
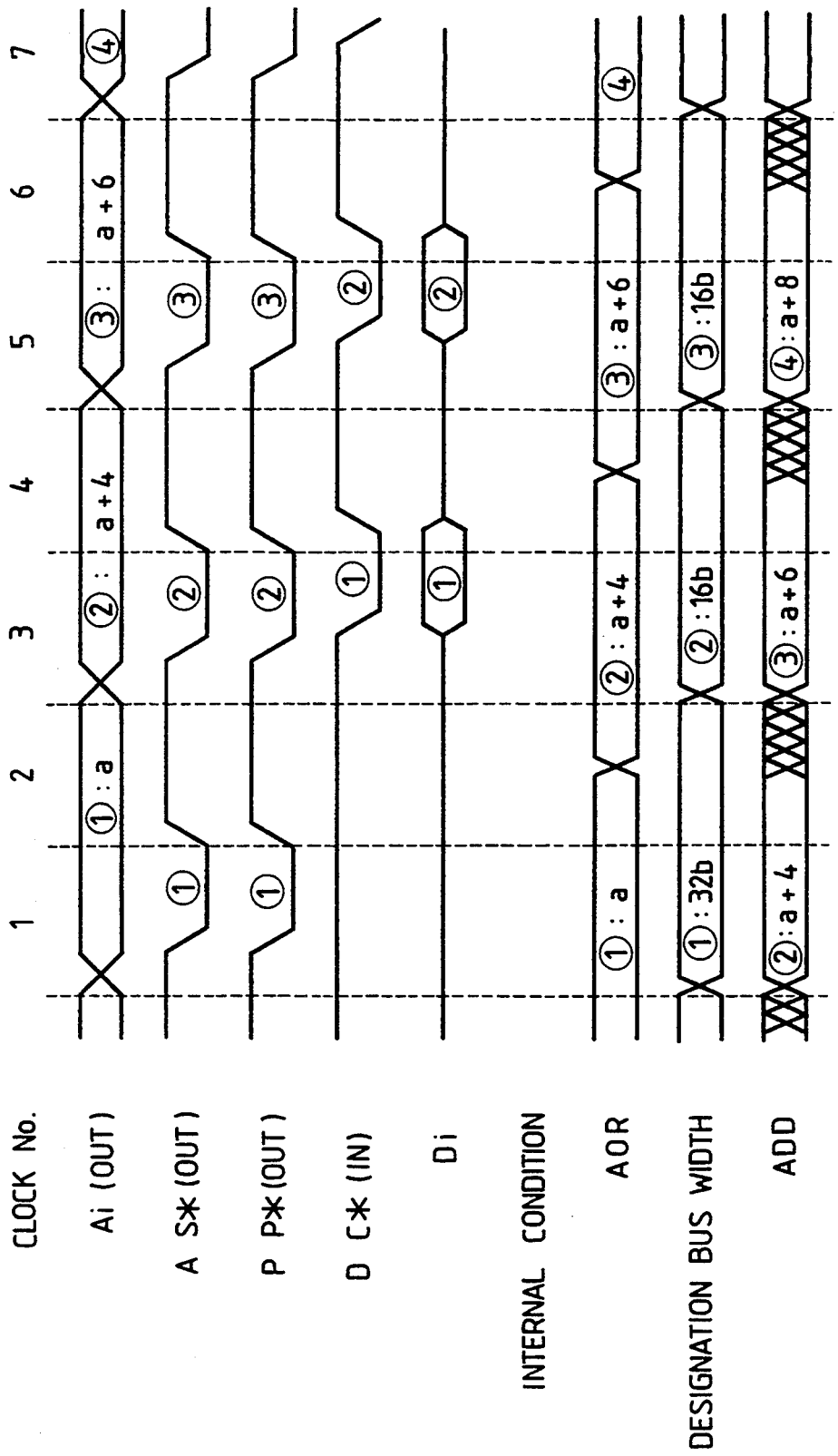
FIG. 9 is a chart of operation timings of when the address pipeline and the bus sizing are carried out in parallel.

FIG. 9 is a timing chart illustrating the operation of a bus in the case when the address pipeline is set to be effective in setting the attribute data of FIG. 8. The value of address a is hexadecimally expressed as BFFFFFFC which is an address at the boundary where the bus size is changed from 32 bits into 16 bits. The read data are presumed to be continuously transferred. The bus operates on two clocks. The operation, however, is slower from the address to the data output and needs three clocks; i.e., this gap is eliminated by the address pipeline operation. In the clock 1, the address a is output to the address bus AB, and the address strobe AS* and the pipeline signal PP* are asserted. The address a is output up to the clock 2 and, then, output of the next address a+4 is started without waiting for the completion of the data transfer. The data Di(①) arrives at the microprocessor 1 with the clock 3. The microprocessor 1 is informed of this fact by the data completion signal DC*. Such an operation is realized by a constitution equipped with an address latch so that the memory side corresponds to the address pipeline operation.

In this embodiment, the pipeline operation of the bus is carried out even at a change of the bus size. This is because, the bus control unit BIF provided in the microprocessor 1 receives the bus size data output from the physical data buffer PIB in response to a physical address that is output, and forms a signal for byte control and outputs it. In the case of the conventional dynamic bus sizing, the bus width for the address a is reported from the external bus controller at a moment of clock 2 or 3. Therefore, the microprocessor effects the addition operation of addresses therein at the clock 3 at the earliest, and does not issue the next address after the clock 3. As described above, the bus size data of physical address are designated in advance via the physical space management table, enabling the address pipeline and the bus sizing to be compatible with each other.

[9] Multiprocessor System

Figure 10:
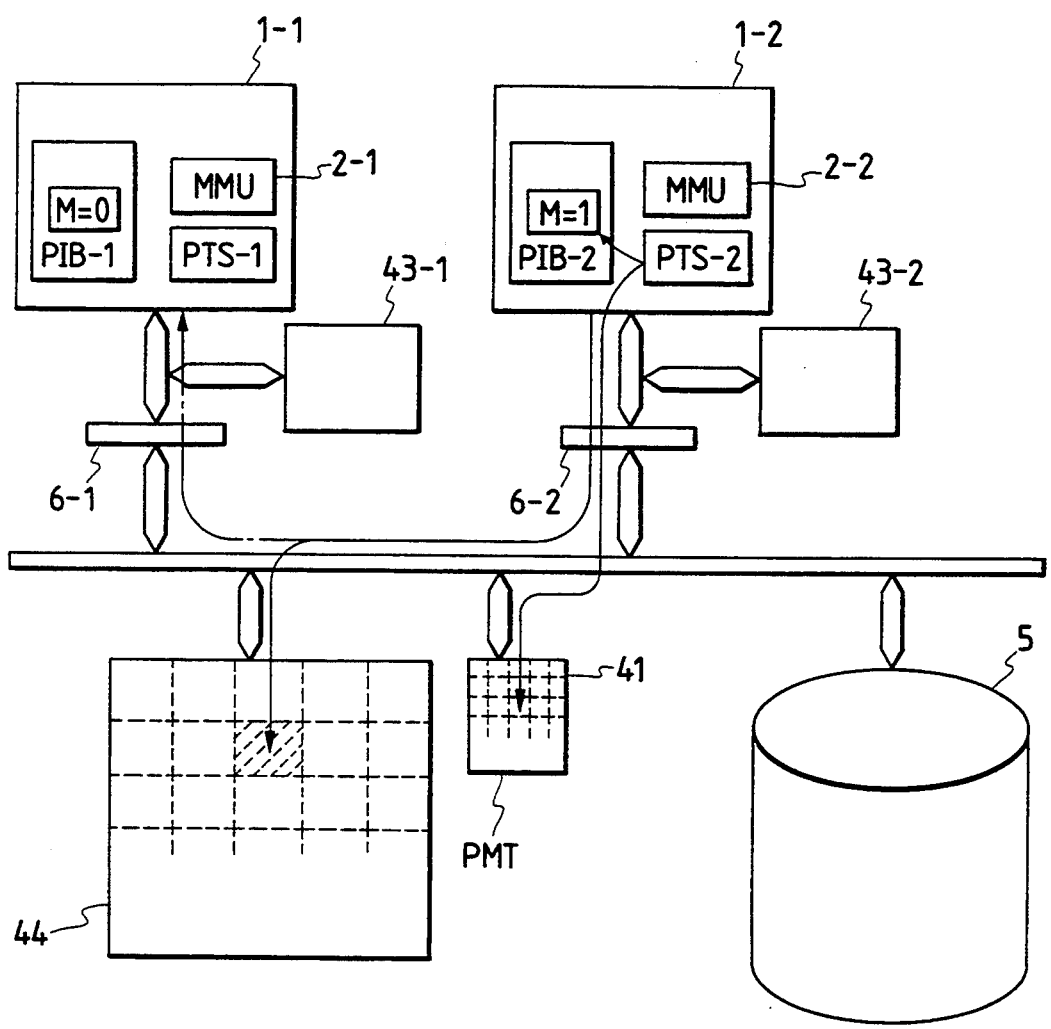
FIG. 10 is a block diagram of a multiprocessor system which has a logical space management mechanism.
Figure 14:
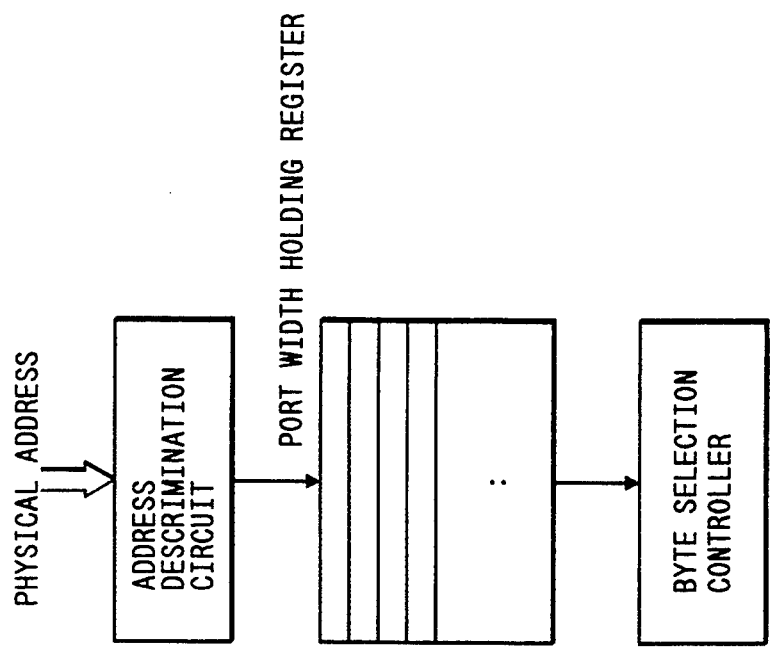
FIG. 14 is a diagram explaining the prior art for managing the bus size utilizing the embedded register.
Figure 13:
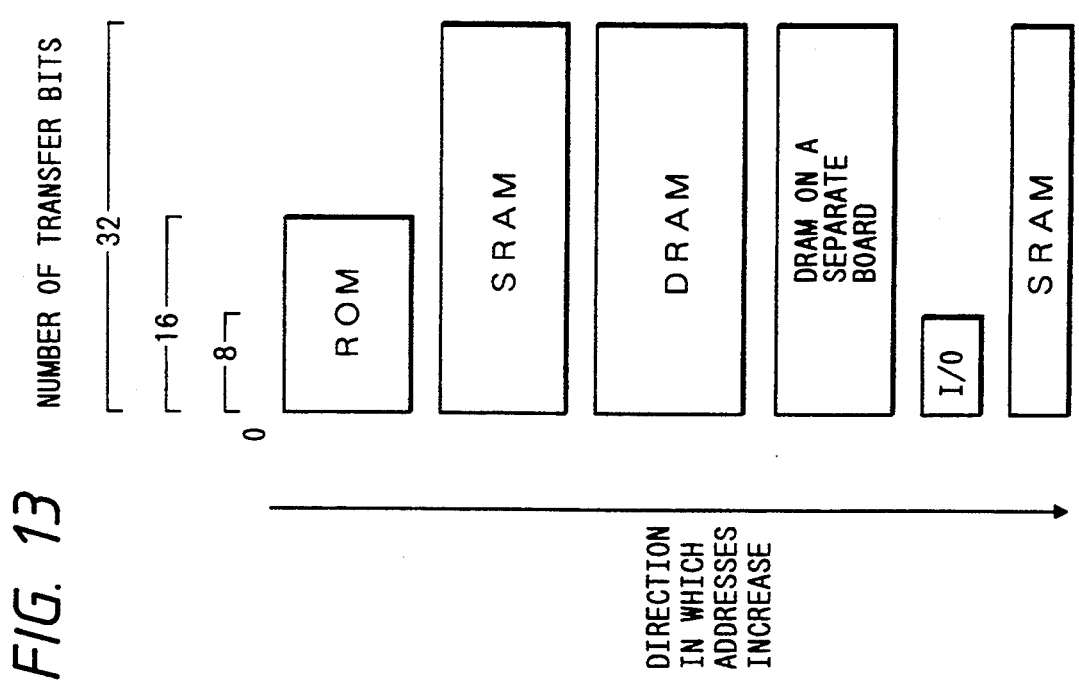
FIG. 13 is a diagram of memory mapping on the physical space.

FIG. 10 illustrates the system constitution of a multiprocessor having the logical space management system 2. The microprocessors 1-1 and 1-2 are capable of making access to local memories 43-1, 43-2, as well as to a shared memory 44 via bus interfaces 6-1 and 6-2. Further, the shared memory 44 is the object of logical space management and generates transfer (replacement of pages) relative to the secondary memory 5. The logical space in the virtual storage system is generally corresponded to the secondary memory 5. When the page of a logical address is not prepared on the memory, therefore, transfer of page generates from the secondary storage device due to the interposition of the operating system. In this case, the operating system retrieves, first, the pages that exist on the memory and to which reference has not been made recently. The reference bit R exists in order to support this function. Moreover, whether data be written back onto the secondary memory is determined depending upon whether the data are written onto the page or not. When the data have not been written, there is no need of writing the data back, and the time for transfer can be saved. The change bit M supports this function. These bits R and M are some of memory attribute data and are prepared on the physical space management table PMT. FIG. 10 shows the condition where the page image of the shared memory 44 is corresponding to the physical space management table PMT in a one-to-one manner.

In the process for replacing pages by the interposition of the operating system, the contents of the physical space management table PMT are successively scanned in order to examine the reference bit R and change bit M. The attribute data such as reference bit and change bit have been held in the table PMT for directly correspondence to the physical addresses. Therefore, the instruction control execution unit 11 directly forms the physical address to carry out the scanning operation; i.e., the processing is very simple, the operating system or the software is relieved of burden, and the processing speed increases.

In this system constitution, each of the processors 1-1 and 1-2 has the physical data buffer PIB which is a copy of the physical space management table PMT, and the change bit M is copied in the physical data buffer PIB, too. Considered below is the case where the processor 1-2 writes data onto the shared memory 44. Further, the attribute data related to the page have already been copied onto both the physical data buffers PIB-1 and PIB-2, and the change bit M is 0. This is the case where no data has yet been written. Here, if the processor 1-2 writes data onto the shared memory 44, the physical management table search control PTS-2 rewrites the related change bit M into 1 among the attribute data corresponding to the physical space management table PMT. At the same time, the physical data buffer PIB-2 in the processor 1-2 which is a copy thereof rewrites the related charge bit M of the corresponding address into 1.

In the case of the multiprocessor system, the copy of the same relation pair exists in other processors, too, i.e., in the processor 1-1, too in this case. It therefore becomes necessary to similarly rewrite the change bit M of the related pair for the corresponding address of the physical data buffer PIB-1 in the processor 1-1. This can be done by a method in which the processor 1-2 informs rewriting to the processor 1-1 through some signal line or a method in which the processor 1-1 monitors the data on the bus, monitors the address in case data is written onto the shared memory 44, and reflects it on the physical data buffer PIB-1. According to this embodiment, the latter bus monitor form is employed by utilizing the bus watcher BWT. It is thus made sure that the contents of the physical data buffer PIB in the processors 1-1, 1-2 become equal to those of the physical space management table 41.

FIG. 11 shows an example of file assignment in the multiprocessor system which performs logical space management in the system constitution of FIG. 10. In order to simplify the description, it is presumed that the physical memory (primary memory 44) has only four pages 1 to 4 as shown in FIG. 11(a). Furthermore, pages a, b, c and d exist on the file (secondary memory 5). The processors 1-1 and 1-2 separately manage the logical space, and logical pages (or often described as virtual pages) on the logical space and the pages on the file do not correspond to each other. In assigning the file on the logical space, for instance, pages a and b on the file correspond to pages 5 and 6 on the logical space in the case of the Processor 1-1, and pages e and f on the file correspond to the pages 5 and 6 on the logical space in the case of the processor 1-2.

FIG. 12 illustrates the condition where the physical memory is used with the file allocated as shown in FIG. 11(b) and where the change bit M is set. A first frame in FIG. 12(a) represents the lapse of time, a second frame represents the access condition by the processor 1-1, and a third frame represents the access condition by the processor 1-2. The upper stages of the second and third frames represent page numbers on the logical space to which access will be made, and the lower stages represent whether the access is for writing (W) or for reading (R). The third to sixth frames represent pages on the file assigned to the pages of the physical memory. Hatched areas represent that the data are transferred from the file to the memory and are written on the memory.

The condition in which the physical memory is used changes as described below. Attention is given to the page 3 of the physical memory. The file is fetched by the physical memory 3 after the lapse of time 3. In this case, the processor 1-1 is trying to read data from the virtual page 3. This corresponds to the page c of the file but has not yet been fetched by the memory. Since the desired page does not exist, the processor 1-1 generates an exception and reads the page c from the file. The destination of transfer is the physical page 3 that has not been used yet. After the transfer processing, the processor 1-1 makes reading access to the virtual page 3 which, in practice, is an access to the physical page 3. Next, after the lapse of time 3, the processor 1-2 writes data onto the virtual page 3. This page is the one denoted by c on the file and corresponds to the physical page 3. Next, after the lapse of time 7, the processor 1-2 tries to read data from the virtual page 5, but the page e of the file that corresponds thereto has not yet been fetched on the memory. Therefore, the processor 1-2 selects the physical page 3 as the page that is least used at the present, writes the contents thereof back to the file, and newly fetches the page e from the file. Thus, the contents of the physical page 3 are changed into page e on the file.

FIG. 12(b) shows the condition of the change bit M up to the lapse of time 6 when the change bit M exists on the address translation table. In this case, the data written onto the virtual page are managed. As for the processor 1-1, therefore, the virtual page 1 and the virtual page 5 having the same content a assigned to the physical page 1 have change bits M which are different from each other. That is, as schematically shown in FIG. 1, this is the condition where the logical pages 1, 5 of logical space 100 are assigned with the lapse of time to the physical page 1 of the physical space 4, and the changed bits M are held in separate places of the logical space management table AT corresponding to the logical pages 1 and 5. Moreover, the logical page 3 has the same content c but has different change bits M for the processors 1-1 and 1-2. This is because, the microprocessors 1-1 and 1-2 manage the attribute data such as change bit M in a manner corresponding to the logical space via their own logical space management systems 2-1 and 2-2. Therefore, the operating system must carry out the logical space management upon fully recognizing this fact; i.e., processing becomes complex such as replacement of pages and extended periods of time are needed for the processing.

Similarly, when the change bit M is managed by the physical space management table PMT, the condition of the change bit M until the time 6 lapses becomes as shown in FIG. 12(c). In this case, the above-mentioned discrepancy does not develop since only those data really written onto the physical page are managed no matter how the data are written onto the virtual page. As a result, changes in the physical pages 1, 2 and 3 are learned by looking at the change bit M. In this case, the management unit of the physical page must be in agreement with or smaller than the management unit of the virtual page. Therefore, when, for example, the virtual page has a size of 4 k bytes, it is desired that the physical page has a size of 4 k bytes, too.

The data are set to the base registers PTBR and ATBR by the microprocessor 1 according to a program. Moreover, the data are set to the tables AT and PMT, too, by the microprocessor 1 according to the program. The user must determine in advance those data that should be set.

The following actions and effects are obtained by the above embodiment.

(1) On the physical space management table PMT disposed outside the microprocessor 1 can be arranged any attribute data that are required depending upon the condition of utilizing the physical space or that are required depending upon the mapping condition, without affected by the memory capacity of memory means in the microprocessor 1. It is therefore possible to manage the attribute data related to physical space such as reference and change data used for the bus sizing and for page replacement maintaining fineness or resolution required by the system no matter how finely the physical space is mapped depending upon the specifications required by the system and the applications.

(2) The microprocessor 1 has a buffer means PIB which primarily holds the attribute data retrieved from the physical space management table PMT in a manner corresponded to the physical addresses, and utilizes the attribute data at the time of access operation when the buffer means PIB contains an effective entry that corresponds to the physical address. Therefore, the constitution of attribute management related to physical space does not cause the chip area of the microprocessor 1 to be increased and whereby it is made possible to form at high speeds the instructions for utilizing the attribute data such as bus size data.

(3) A table structure having a plurality of levels such as a physical section table or a physical page table is employed as a physical space management table PMT. The physical space management table search control means PST has one or a plurality of base registers PTBR for designating address of the physical space management table PMT which is retrieved based on a value obtained by calculating a value of the base register PTBR and part of the physical address and/or based on a value obtained by calculating the above value and part or whole of the remainder of the physical addresses. This makes it possible to increase the efficiency for utilizing the memory for the physical space management table PMT and to very finely manage the attribute data for the physical space.

(4) The bus size data of physical address is designated in advance via the physical space management table, and the bus control unit BIF in the microprocessor 1 forms a signal for controlling the byte in response to the bus size data output from the physical data buffer PIB. Therefore, the address pipeline operation can be reliably carried out even at the change of the bus size.

(5) The attribute data are managed directly corresponding to the physical space, and one reference/change data is corresponding to one physical address even when the page is shared to allocate the same physical address to different addresses on the logical space or even when separate logical space management tables are used by the individual processors in the multiprocessor constitution. This makes it very easy to manage the reference/change data without developing a discrepancy between the reference/change data and the physical addresses.

The foregoing is a concrete description of the invention accomplished by the present inventors by way of an embodiment. It should, however, be noted that the invention is in no way limited thereto only but can be modified in a variety of other ways without departing from the spirit and scope of the invention.

In the aforementioned embodiment, the logical space management mechanism was contained in the microprocessor. It is, however, also allowable to dispose the logical space management system such as a memory management unit outside the microprocessor. Moreover, the physical space management table is not limited to the two-level structure of the above-mentioned embodiment. Furthermore, the attribute data need not contain all of those mentioned in the above embodiment and may further contain other attribute data.

Briefly described below are the effects obtained by a representative example of the invention disclosed in this application.

That is, any attribute data required depending upon the condition of utilizing the physical space or the mapping condition can be arranged on the physical space management table disposed outside the microprocessor. Therefore, the attribute data related to physical space such as reference/change data used for the bus sizing and page replacement can be managed maintaining fineness or resolution required by the system no matter how finely the physical space is mapped depending upon the specifications required by the system or the application, since they are not affected by the memory capacity of memory means in the microprocessor 1.

The microprocessor has a buffer means which primarily holds the attribute data retrieved from the physical space management table in a manner corresponding to the physical address, and utilizes the attribute data at the time of access operation when the buffer means contains an effective entry that corresponds to the physical address. Therefore, the constitution of attribute management related to physical space does not cause the chip area of the microprocessor to be increased and whereby it is made possible to form at high speeds the instructions for utilizing the attribute data such as bus size data.

A table structure having a plurality of levels such as a physical section table or a physical page table is employed as a physical space management table, whereby it is allowed to increase the efficiency for utilizing the memory for the physical space management table and to very finely manage the attribute data for the physical space.

The bus size data of physical address is designated in advance via the physical space management table, and the bus control unit in the microprocessor forms a signal for controlling the byte in response to the bus size data output from the physical data buffer. Therefore, the address pipeline operation can be reliably carried out even at the change of the bus size.

The attribute data are managed directly corresponding to the physical space, and one reference/change data is corresponding to one physical address even when the page is shared to allocate the same physical address to different addresses on the logical space or even when separate logical space management tables are used by the individual processors in the multiprocessor constitution. This makes it very easy to manage the reference/change data without developing discrepancy between the reference/change data and the physical addresses.

What is claimed is:

1. A microprocessor formed on a semiconductor chip, to be used together with an external memory, comprising:

instruction control/execution means for fetching an instruction and executing an operation according to the instruction;

means for generating a logical address;

logical space management means for translating the logical address to a physical address;

physical space management means for managing an attribute of the physical address formed by the logical space management means including physical address buffer means for holding physical address data and attribute data for indicating an attribute of a region to be specified by the physical address data held by the physical address buffer means, and physical space management table search control means which retrieves attribute data corresponding to a physical address formed by the logical space management means, from the physical address buffer means, and which retrieves the attribute data corresponding to the physical address formed by the logical space management means, from the external memory if physical address data corresponding to the physical address formed by the logical space management means does not exist in the physical data buffer means; and bus means coupled to the instruction control/execution means and to the physical space management means, wherein the bus means is controlled in accordance with retrieved attribute data.

2. A microprocessor according to claim 1, wherein the physical space management table search control means includes at least one base register which stores address data indicating an address of a physical space management table provided in the external memory, and means for searching the physical space management table on the basis of both of the stored address data in the base register and a part of the physical address formed by the logical space management means if the physical address data corresponding to the physical address formed by the logical space management means does not exist in the physical data buffer means, wherein the physical space management table includes a plurality of physical address data and a plurality of attribute data corresponding to the physical address data.

3. A microprocessor according to claim 2, wherein the attribute data includes bus size data for designating size of a bus to be used for transferring data between the microprocessor and the region specified by the physical address, and wherein said bus means includes means for changing the size of the bus in accordance with the bus size data.

4. A microprocessor according to claim 2, wherein the physical space management table search control means has rewriting means for writing the attribute data searched from the physical space management table to the physical data buffer means.

5. A microprocessor formed on a semiconductor chip, to be used together with an external memory, comprising:

execution means for executing an operation in compliance with an instruction;

address translating means for translating a logical address formed by the execution means to a physical address; and a physical address management circuit which receives the physical address and feeds to the execution means a control signal in compliance with attribute data for representing an attribute of a region specified by the physical address;

wherein the physical address management circuit includes a physical address buffer for holding physical address data and attribute data corresponding to the physical address data, wherein the physical address management circuit includes search means responsive to a predetermined physical address from the address translating means for providing predetermined attribute data corresponding to the predetermined physical address from the physical address buffer when predetermined physical address data corresponding to the predetermined physical address exists in the physical address buffer and for providing the predetermined attribute data from the external memory when the physical address buffer does not include the predetermined physical address data that corresponds to the predetermined physical address formed by the address translating means, and wherein the external memory includes a table having a plurality of physical address data and a plurality of attribute data corresponding to the plurality of physical address data.

6. A microprocessor according to claim 5, wherein the attribute indicates size of a bus for transferring data between the microprocessor and the external memory.

7. A microprocessor according to claim 6, wherein the execution mean includes means for forming a logical address in response to the control signal.

8. A microprocessor according to claim 6, wherein the execution means includes means for changing the size of the data in response to the control signal.

9. A microprocessor according to claim 8, wherein the execution means includes means for generating a logical address in response to the control signal.

10. A microprocessor according to claim 5, wherein the execution means includes means for generating a logical address response to the control signal.

11. A microprocessor, formed on a semiconductor chip, to be used together with an external memory, comprising:

instruction means for executing an instruction;

a physical address forming circuit which generates a physical address;

a physical space management unit including a physical address buffer which holds physical address data and attribute data for representing an attribute of a region specified by the held physical address data, and a search control unit including first means for searching physical address data corresponding to a predetermined physical address generated by the physical address forming circuit from the physical address buffer, second means for providing predetermined attribute data corresponding to the predetermined physical address if the predetermined physical address data corresponding to the predetermined physical address is found in the physical address buffer, third means for searching the attribute data corresponding to the predetermined physical address from the external memory which has a physical table including a plurality of physical address data and a plurality of attribute data corresponding to the plurality of physical address data if the physical address data corresponding to the predetermined physical address is not found in the physical address buffer, and fourth means for providing the predetermined attribute data found by the third means; and an execution unit which is coupled to the instruction means and to the physical space management unit and which executes an operation in accordance with the predetermined attribute data corresponding to the predetermined physical address, in access to a region specified by the predetermined physical address.

12. A microprocessor according to claim 11, wherein the third means includes at least one register in which address data is stored, and wherein the predetermined address data is provided on the basis of the address data stored in the register and a part of the predetermined physical address generated by the physical address forming circuit.

13. A microprocessor according to claim 12, wherein the attribute data represents size of a bus to be used in a data transfer operation for transferring data between the microprocessor and the region specified by the predetermined physical address.

14. A microprocessor according to claim 13, wherein the physical address forming circuit includes an address translation unit which translates a logical address which is generated in execution of a plurality of instructions to the physical address.

15. A storage management system comprising:
a memory including a physical space management table which holds a plurality of physical address data and a plurality of attribute data corresponding to the plurality of physical address data, wherein each of the plurality of attribute data represents an attribute of a region to be specified by corresponding physical address data, and
a microprocessor, formed on a semiconductor chip, including:
means for generating a logical address;
a logical space management table for holding translation data to be used for translating the logical address;
logical space management means for translating the logical address to the physical address by utilizing the translation data in the logical space management table;
a physical space management circuit including a physical data buffer which stores attribute data and physical address data corresponding to the stored attribute data, means responsive to a first physical address from the logical space management means for providing fir attribute data from the physical data buffer, when physical address data corresponding to the first physical address exists in the physical data buffer, and means for providing the first attribute data from the physical space management table outside of the microprocessor when the first physical address data corresponding to the first physical address does not exist in the physical data buffer; and
bus means, coupled to the physical space management circuit, for transferring data between the outside and the inside of the microprocessor in accordance with attribute data provided from the physical space management circuit.

16. A storage management system according to claim 15, wherein the physical space management circuit has physical space management table search control means which has a first function for retrieving the first address data from the physical data buffer in response to the first physical address from the logical space management circuit, and a second function for accessing the memory to obtain the first physical address data and the first attribute data from the physical space management table after executing the first function, in response to absence of the first physical address data in the address data buffer.

17. A storage management system according to claim 16, wherein the attribute data includes bus size data for designating the size of a bus for transferring data between the inside of the microprocessor and hardware outside of the microprocessor.

18. A storage management system according to claim 17, wherein the physical space management table search control means has means for rewriting the attribute data held by the physical data buffer in accordance with the attribute data provided from the physical space management table, in order to maintain matching of data between the physical space management table and the physical data buffer.

19. A storage management system according to claim 18, wherein the attribute data includes reference data that indicates whether reference is made to the region and change data that indicates whether data is changed or not for the region.

* * * * *